United States Patent [19]
Dunlap et al.

[11] 3,832,111
[45] Aug. 27, 1974

[54] APPARATUS FOR MAKING COMPONENT PARTS OF SHOES AND THE LIKE COMPRISED OF THERMOPLASTIC SHEETING

[75] Inventors: Robert B. Dunlap, Medway; Adrian E. Balfour, Framingham, both of Mass.

[73] Assignee: Compo Industries Inc., Waltham, Mass.

[22] Filed: Mar. 13, 1972

[21] Appl. No.: 234,033

Related U.S. Application Data

[63] Continuation-in-part of Ser. No. 128,975, March 29, 1971, abandoned.

[52] U.S. Cl.............. 425/174.2, 425/117, 425/119, 425/347, 425/371, 425/384, 425/385, 425/407
[51] Int. Cl................................................. B29c 3/00
[58] Field of Search .......... 425/347, 384, 407, 453, 425/174.8, 117, 119, 385, 200, 201, 363, 371, 174.2

[56] References Cited
UNITED STATES PATENTS

| | | | |
|---|---|---|---|
| 2,058,880 | 10/1936 | Hunt | 425/347 X |
| 3,131,431 | 5/1964 | Kolany et al. | 425/117 |
| 3,298,067 | 1/1967 | Tencate | 425/DIG. 44 |
| 3,407,443 | 10/1968 | Beebee et al. | 425/340 X |
| 3,492,697 | 2/1970 | Boyce | 425/407 X |
| 3,504,074 | 3/1970 | Snow | 425/384 X |
| 3,517,424 | 6/1970 | Anthony et al. | 425/117 X |
| 3,518,725 | 7/1970 | Donofrio | 425/388 X |
| 3,583,036 | 6/1971 | Brown | 425/185 |
| 3,635,609 | 1/1972 | Balamuth | 425/174.2 X |

Primary Examiner—Robert L. Spicer, Jr.
Attorney, Agent, or Firm—G. Eugene Dacey

[57] ABSTRACT

The method of making relatively thin parts with a thermoplastic face having a predetermined surface configuration comprising providing a mold with the surface configuration desired to be imparted to the face, pressing and heating the material of the face in contact with the surface of the mold at a temperature such as to cause the material fused to take the impression of the mold and while the material is in a fused condition controlling flow of the material within the perimeter of the mold and cooling it to make permanent the impression imparted to the material.

The apparatus for carrying out the method comprises a mold embodying the surface configuration to be imparted to the part, a press and a heat generator for fusing and applying molding pressure to the part. The mold is comprised of a material having a lower dielectric constant than the material of the part to be molded, preferably silicone rubber or a silicone containing material. Heating is effected in a high frequency field, preferably by connecting the platens of the press to the terminals of a high frequency generator. Optionally, two presses may be employed, one to effect fusing and molding and another to effect cooling while holding the part at molding pressure. If a single press is employed the platens of the press are preferably provided with cooling coils. Optionally, the part and the mold may be preheated.

14 Claims, 28 Drawing Figures

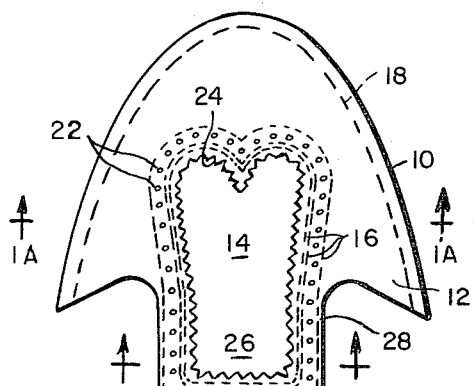
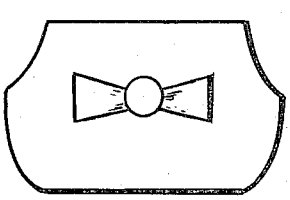
FIG.3  FIG.4
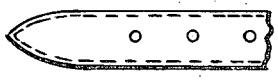
FIG.5
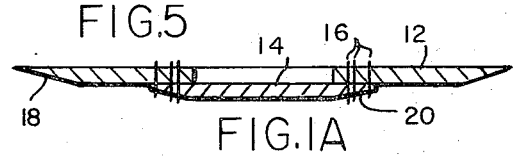
FIG.1A
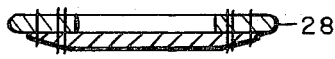
FIG.1B
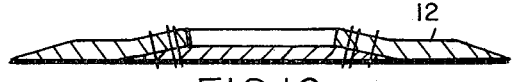
FIG.1C
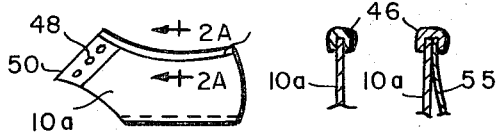
FIG.2  FIG.2A  FIG.2B
FIG.8
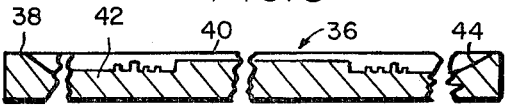
FIG.10
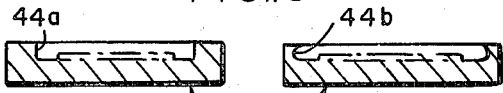
FIG.11  FIG.12
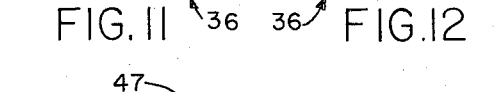
FIG.13
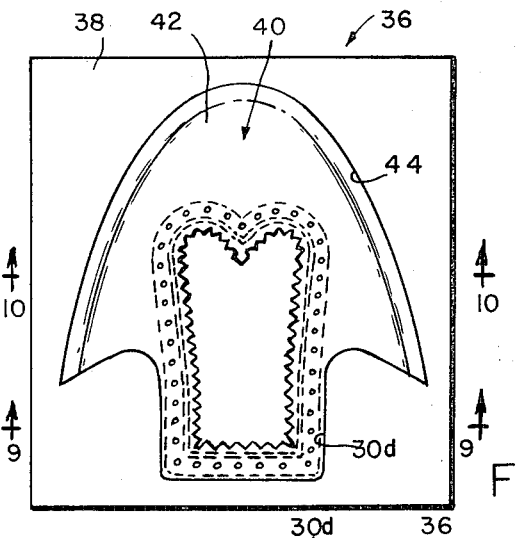
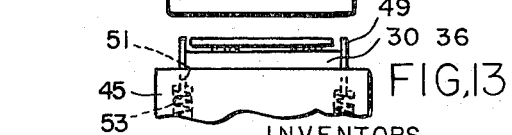
INVENTORS
ROBERT B. DUNLAP
ADRIAN E. BALFOUR
BY *J. Eugene Dacey*
ATTY

APPARATUS FOR MAKING COMPONENT PARTS OF SHOES AND THE LIKE COMPRISED OF THERMOPLASTIC SHEETING

BACKGROUND OF THE INVENTION

This is a continuation-in-part of copending U.S. Pat. application Ser. No. 128,975, filed Mar. 29, 1971, now abandoned.

Making a negative molding die from a master pattern and then employing the mold to reproduce components comprised of sheet thermoplastic in exact imitation of the master pattern is not a new procedure as disclosed in such U.S. Pat. Nos. as Forrest 3,369,949, Baird 3,311,692 and Flasher 2,463,370. Forrest provides for reproducing on the surface of thermoplastic sheeting the configuration of a corduroy fabric by casting a negative mold on the fabric and then employing the negative mold to impart the configuration of the corduroy fabric to the surface of the thermoplastic sheeting. Baird describes an embossing process in which a negative mold is made, for example, by etching, whereupon the mold is used to emboss the surface of thermoplastic sheeting to reproduce the configuration of the mold in minute detail, employing heat to first fuse the surface and then pressure to cause the surface of the sheet to take the configuration of the mold surface of the mold. Flasher, like Baird, employs a mold which has been engraved, heats the area of the sheet plastic to be embossed to effect fusion and then presses the sheet against the mold surface. Phillips U.S. Pat. No. 2,904,838, which relates to the art of shoe manufacture and to the preparation of shoe uppers with which this invention is particularly concerned, discloses a method of preparing uppers of thermoplastic sheet material treated to imitate in appearance and quality the grain of natural leather uppers and the conventional embellishments currently in style. In the Phillips patent a master pattern of the shoe upper is lasted on a conventional last, then removed and employed to make a negative mold having a concave surface corresponding in contour to the initially lasted leather upper and bearing the surface adornmentation of the master pattern. The negative mold is used to reproduce a thermoplastic upper corresponding to that of the original leather upper. The Phillips method is limited to surface treatment, the end product of the method requiring further shoe making operations such as trimming, skiving, edge forming, punching, cutting, and the like before it is ready for use.

This invention relates to an improved method which provides for performing such operations in addition to surface molding as edge treatment, formation of cutouts and eyelet holes, provision of areas and edges of different color and securing of lining and reinforcing elements. The method also includes providing for more exact imitation of a master pattern than has heretofore been possible and to the simultaneous making of several components and to an apparatus for carrying out the aforesaid method.

SUMMARY

This invention relates to making relatively thin parts with thermoplastic faces, for example, parts of shoes and other articles of wearing apparel and accouterments in exact imitation of leather, fabric or the like. According to the method a master pattern of the part to be reproduced is first made whereupon a negative of the master pattern is made from the master pattern and this negative comprising a mold is used to mold the face of the part by application of pressure and heat to cause the material at the face to fuse and to take the impression of the mold and while the material is in the aforesaid fused condition controlling flow within the perimeter of the mold and cooling it to make the impression permanent. The parts may be comprised of thermoplastic in sheet form to which a backing is applied or to which a backing is already applied. The molding pressure and heat are preferably carried out simultaneously. Cooling to below the fusing temperature to obtain permanence of the impression is desirably carried out while continuing to hold the part under molding pressure. The method optionally includes simultaneously applying to the face overlays or pigments and to the back one or more reinforcing layers. The part may be precut to the configuration of the mold cavity and if so, edging strips may be applied during the molding operation to provide for finished edges. Cut-outs, eyelet holes and the like may also be formed simultaneously with the surface and edge treatment.

For carrying out the method in its several forms the preferred mold is comprised of silicone rubber or one of its compounds, a press is employed to apply pressure and a high frequency generator is employed to effect heating, for example, by connecting the platens of the press across a high frequency generator. A single press provided with fixed and movable platens and with a high frequency field generated between the platens is the simplest form of apparatus and with such apparatus the operator places the mold with the part to be molded between the platens, applies pressure and high frequency heating for a predetermined length of time and then removes the mold and part and strips the part from the mold. Desirably there is means for cooling the platens so as to shorten the time required to effect permanent setting of the part. For optimum results means is provided for preheating the part and forpreheating the mold. Two presses may be employed, one in which to apply molding pressure in a high frequency field and the other to apply molding pressure for cooling of the parts. Also for high production the apparatus comprising the press and preheating means may be arranged about a rotary platform or along a conveyor so that the operation may be continuous with the component parts and molds disposed on the platform or conveyor at a place of loading and the finished parts stripped from the mold at a place of discharge.

The invention will now be described in greater detail with reference to the accompanying drawings wherein:

FIG. 1 is a plan view of a master pattern comprising the forepart of a shoe upper;

FIG. 1a is a section taken on the line 1a—1a of FIG. 1;

FIG. 1b is a section taken on the line 1b—1b of FIG. 1;

FIG. 1c is a section corresponding to FIG. 1a with the component parts flattened against a plane surface;

FIG. 2 is a plan view of a master component comprising the quarter portion of a shoe upper;

FIG. 2a is a section taken on the line 2a—2a of FIG. 2;

FIG. 2b is a section corresponding to FIG. 2a with a lining member added;

FIG. 3 is a plan view of a master pattern comprising one side of a pocketbook or purse;

FIG. 4 is a plan view of a master pattern comprising the back of a glove;

FIG. 5 is a portion of a master pattern comprising a belt or watch strap;

FIG. 6 is a plan view of a mold comprising the negative of the master pattern shown in FIG. 1;

FIG. 7 is a section of the mold shown in FIG. 1 taken on the line 7—7 of FIG. 6;

FIG. 8 is a transverse section of a mold such as shown in FIGS. 6 and 7 with a flat molding surface;

FIG. 9 is a plan view of a mold of the cavity type containing a mold cavity comprising the negative of the master pattern of FIG. 1;

FIG. 9a is a transverse section of a mold such as shown in FIG. 9 taken on the line 9a—9a of FIG. 9;

FIG. 10 is a transverse section of FIG. 9 taken on the line 10—10 of FIG. 9;

FIG. 11 is a section, to much larger scale, of a mold wherein the side wall is flat;

FIG. 12 is a section showing a grooved side wall;

Figure 14:
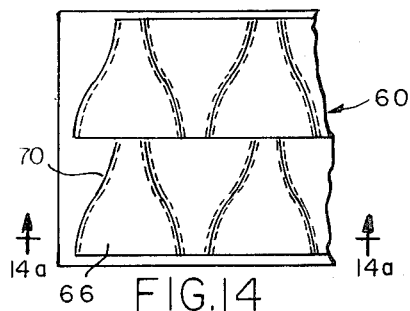
Figure 15:
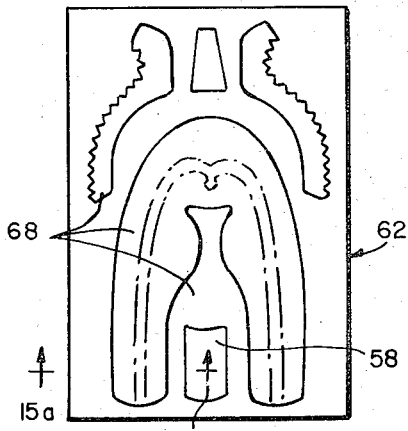
Figure 14A:
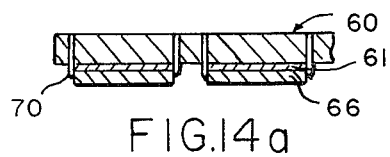
Figure 16:
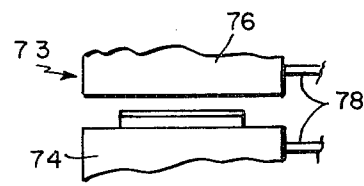
Figure 15A:
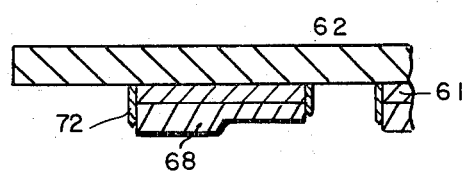
Figure 16A:
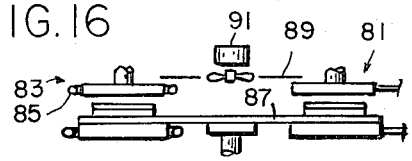
Figure 17:
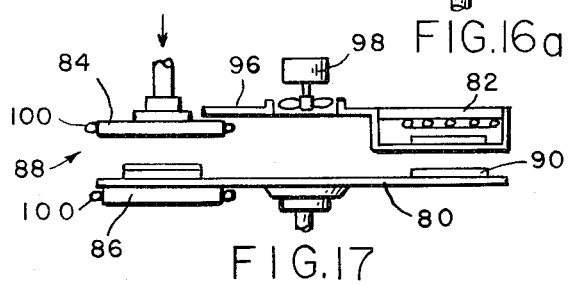
Figure 18:
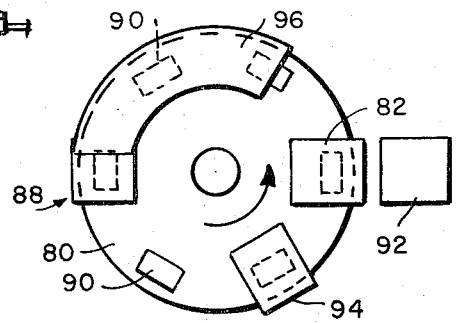
Figure 19:
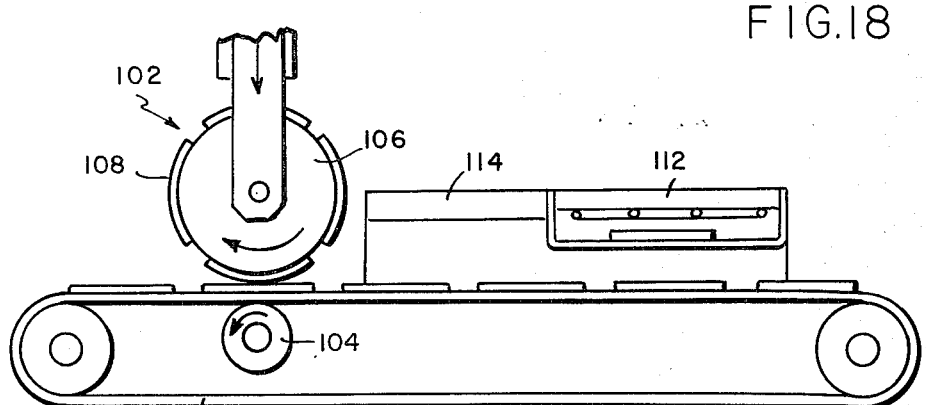

FIG. 13 diagrammatically illustrates a press with a mold resting on the lower supporting platen beneath an upper platen adapted to be moved downwardly to press a blank to be molded against the mold;

FIG. 14 is a fragmentary plan view of a mold for molding a plurality of parts;

FIG. 14a is a section taken on the line 14a—14a of FIG. 14;

FIG. 15 is a plan view of a mold for molding a plurality of parts;

FIG. 15a is a transverse section taken on the line 15a—15a of FIG. 15;

FIG. 16 diagrammatically illustrates a press for effecting molding of a blank with a mold by means of high frequency heating;

FIG. 16a diagrammatically illustrates apparatus for molding comprising two platen-type presses, one of which embodies a high frequency heat generator by means of which the blank is heated to effect fusion and molding and the other of which is for maintaining the molding pressure and effecting cooling of the blank to below fusion;

FIG. 17 diagrammatically illustrates apparatus for molding comprising a platen-type press, a heat generator and an indexable table for moving blanks from the generator to the press;

FIG. 18 is a plan view of an apparatus similar to that shown in FIG. 17 provided with additional means for preheating blanks and preheating the molds; and FIG. 19 diagrammatically illustrates a roller-type press.

The drawings (FIGS. 1 to 5, inclusive) illustrate several components customarily comprised of leather which may be reproduced according to this method with a thermoplastic face simulating leather. FIGS. 1 and 2 comprise component parts of a shoe upper; FIG. 3 one side of a pocketbook; FIG. 4 the back of a glove; and FIG. 5 a portion of a belt or watch strap. All of these articles embody in common surface and edge treatment in the form of embellishments.

Referring specifically to FIG. 1 the shoe part there shown is the forepart portion of a shoe upper of wingtip construction comprising an outer part 12 and an inner part 14 joined to each other by stitching 16. The outer edge of the outer part is beveled or skived at 18 and the outer edge of the inner part is skived at 20. Along the length of the seam is a line of spaced perforations 22 and the inner edge of the outer part inwardly of the perforations is pinked at 24. The rearwardly extending portion of the inner part 14 comprises a tongue 26 and since its edge will be exposed it is skived and the skived portion turned over and stitched or cemented to form a rounded smooth edge 28.

In order to reproduce a component such as that shown in FIG. 1 a master pattern 10 is first fabricated to embody the surface and edge formation desired whereupon a mold is made from the master pattern which may then in turn be used to reproduce an exact replica of the master pattern. In the case of the forepart, the master pattern shown in plan view in FIG. 1 and in transverse section in FIGS. 1a and 1b is flattened against a plane surface as shown in FIG. 1c, whereupon a mold of this flattened pattern is made, preferably by applying a silicone rubber to the surface to form a block of silicone rubber comprising a mold 30, as shown in FIGS. 6 and 7, which corresponds substantially in shape to the master pattern, is of substantial thickness and has a mold surface which embodies the negative of the surface and edge formation of the master pattern. FIG. 6 shows the mold surface as comprising a portion 30a which embodies in detail the embellishments on the surface of the master pattern and FIG. 7 portions 30b and 30c embodying the shape of the edges of the master pattern. The portion 30b is beveled and the portion 30c is plane thus providing, respectively, for a skived edge and a plane edge corresponding to the skived edge and rounded edge of the master pattern. It is sometimes desirable to have a substantially flat edge, that is an edge which is neither beveled nor beaded, and so the mold may, as shown in FIG. 8, be provided with a flat marginal surface.

The mold illustrated in FIGS. 6 and 7 is of the relief or bold face type; however, a cavity-type mold may be employed, such as shown in FIGS. 9, 9a and 10, comprising a substantially rectangular block 36 embodying a flat surface 38 within which is a cavity 40 having a bottom wall 42 and a peripheral side wall 44. The bottom wall will comprise a negative of the surface of the master pattern and the side wall the negative of the shape of the edge of the master pattern. FIG. 9a shows a groove 30d for forming the edge 28 and FIG. 10 a bevel 44 for forming the beveled edge 18. FIGS. 11 and 12 show cavity-type molds wherein the walls are, respectively, flat as shown at 44a and grooved at 44b.

As related above, the preferred mold is comprised of silicone rubber, a room temperature vulcanizing material which is characterized in that it will reproduce detail, is resilient, is inexpensive for use in making molds and has suitable dielectric properties, desirably a dielectric constant lower than that of the part to be molded.

A disadvantage of silicone rubber is that it does not withstand repeated use and so the silicone mold made from the master pattern may be used to make a second silicone mold comprising a positive reproduction of the master pattern and from this latter mold a negative mold is made of a different material which has greater wear-resistance than silicone rubber.

Optionally, the mold may be comprised of metal; however, since the construction of metal molds to the exactness desired is relatively expensive compared to making molds of silicone rubber the latter are preferred. In contrast to a mold comprised of silicone rubber and like compounds it is almost always necessary to use a parting compound with a mold comprised of metal to enable stripping the part from the mold following the molding operation.

According to one mode of practicing the invention the face of a part comprised of thermoplastic sheeting with or without an attached backing is subjected to molding pressure at the temperature of fusion of the thermoplastic while in engagement with the mold 30, 35 between the platen 45, 47 of a press. Application of molding pressure to the parts effects displacement and flow of the material at the face into intimate engagement with the surface of the mold and at the same time effects lateral flow of the material at the edges into conformation with the beveled or grooved portions thereof. Lateral flow is controlled at the edges partly by the edge formation of the mold and partly by cooling the mold so as to effect coalescence and congealing of the thermoplastic as it flows into engagement with the beveled or grooved portions of the mold. If, as stated above, a plane edge is desired the beveled and grooved portions are omitted and control of the edge is achieved solely by cooling the mold fast enough so that lateral flow is restricted to the edge face, that is the thermoplastic merely flows over the edge forming a coating in the form of a smooth surface layer covering the edge face. When employing a mold of the relief type which has no bounding wall around the mold surface it may be desirable to place a curb 49 (FIG. 13) on the support peripherally on the mold to assist in limiting lateral flow to the edge face. The curb 49 must be adapted to yield with the application of molding pressure to permit the pressure-applying platen to press the part into engagement with the bottom of the mold and so preferably is comprised of a yieldable material. If it is comprised of a metal a groove is provided in the face of the support within which the curb is yieldably supported by spring means 53 in its operative position. The use of a curb has the advantage of serving as a positioning device which enables dropping the part onto the mold in registration with the mold surface.

When employing a cavity-type mold such as illustrated in FIGS. 9, 9a, 10 and 11, the same procedure is followed, that is, the mold together with the part to be molded is placed between the platens of the press and molding pressure at the temperature of fusion is applied to the back to press the face against the bottom of the mold. The fused surface of the part is caused to conform to the bottom and the laterally flowing material will be caused to conform to the beveled or grooved formation in the wall of the mold cavity. A flat edge may be formed by omitting the bevel and/or groove so that the wall is perpendicular to the bottom. When using this type of mold the wall will limit lateral flow. The depth of the mold cavity should be less than the thickness of the part to enable applying a molding pressure which will effect surface reproduction in accordance with the different surface levels which represent thickness, offsets and detail to produce a finished part which is not appreciably thinner than the sheeting. A mold comprised of a material which will yield to the molding pressure so as to decrease the depth of the cavity slightly under pressure will insure application of molding pressure to the part. If a metal mold is used the side wall of the mold may be made movable with respect to the bottom and yieldably supported so as to be movable relative to the bottom during the application of molding pressure. In either case it may be desirable to employ a part embodying a material which will expand when heated so that during the application of molding pressure and heat the expansion will tend to force the part into the mold cavity. Thermoplastic sheeting comprising a foam ply with a skin coextensive with one surface may be employed. The foam ply generally contains residual foam forming material so that when reheated as part of the molding process the residual material effects expansion and this forces the part into the mold cavity. A very important aspect of the foam layer is that it improves the "feel" of the component and insures very fine detail in reproduction. A somewhat similar effect may be achieved by placing a layer of resilient material against the back side of the part so that application of molding pressure operates to force the part into the mold. In carrying out the method under conditions where the molding pressure and plasticization are simultaneous, the resilient material is disposed at the back of the part.

The part subjected to molding as aforesaid may be of larger area than the mold surface or may be precut to the size or slightly smaller than the area of the mold surface. When the part is of larger area than the mold surface it is trimmed following the molding operation. Optionally, as will appear hereinafter, the trimming may be effected simultaneously with the molding operation.

The molding thus far described has been exclusive to imparting a predetermined configuration to the face and edge of the blank; however, it is possible at the same time to add pieces of sheet material to the back and edges of the part. Thus it is within the scope of the invention to precut a piece of sheet material to a shape corresponding to the area of the part 14 bounded by the pinked edge of the part 12 of the master pattern shown in FIG. 1. The piece may be dropped onto the mold surface or may be lightly tacked to the part. Such a piece may be of a different color than the part and when combined therewith will afford a color contrast. Pieces of a different configuration and color may be applied to other areas of the part to form trim and such pieces may contain perforations, openings and the like so that when applied the underlying material will show through. FIG. 2 shows pieces in the form of piping 46 and a stay 48 applied, respectively, to the top and forward edges of a quarter blank 10a. The piping strip 46 may be precut, folded and tacked to the cut edge of the part so as to cover the cut edge and to extend downwardly along the outer and inner sides. Optionally, the piping strip may be extruded of thermoplastic material with a U-shaped cross-section. During the application of the molding pressure the laterally flowing material finds its way between the inner side of the piping strip and the edge of the part so as to produce an integrated structure. The piping strip in this instance serves to control the lateral flow to the shape of the piping strip. By employing a U-shaped piping strip of a color different from that of the blank an attractive edge finish may be provided which conceals the cut edge of the blank.

Color treatment of the face of the part may also be obtained by depositing a pigmented thermoplastic on the mold surface at predetermined areas prior to placing the part in engagement with the mold surface. Desirably to obtain a fine reproduction and durable finish a thin layer of dissolved plastic or plastic monomer is sprayed on the surface of the mold prior to placing the part to be molded and any inserts, overlays or pigmented material.

Sheet material in the form of lining elements and/or reinforcing elements may be applied to the back side of the part. Such lining and reinforcing elements may be comprised of any material suitable for the purpose and if not containing thermoplastic components a thermoplastic adhesive is applied to the surfaces of a kind such as will become activated by the application of the fusing heat. The adhesive may be applied in liquid form and allowed to dry prior to use or may be provided in sheet or web form and cut to shape and interposed between the part and the lining element so as to become activated during fusion of the part. Adhesive may be applied to the entire surface or only part of the surface so as to attach the lining element in certain areas while leaving other areas unattached, for example, to provide counterpockets. For example, a lining element 55 (FIG. 2b) may be attached to the inner side of the quarter part shown in FIG. 2 along its upper edge by applying adhesive to the upper edge of the lining element and interposing it between the inner side of the part and the portion of the piping strip at the inner side. The remainder of the lining element is left unattached.

As illustrated in FIG. 2 the forward end of the quarter part contains a row of eyelet holes 48 and it is within the scope of the invention to employ cutting dies in conjunction with the mold to cut through the part simultaneously with the molding to form the eyelet holes. The cutting die operates not only to cut through the part as the molding pressure is applied but also to form a smooth edge finish around each hole by confining the lateral flow to the edge faces of the openings. In the same way uppers for women's shoes and sandals containing large openings and cut-outs can be made by combining with the mold appropriate cutting dies for cutting the openings simultaneously with the molding operation.

FIG. 1 is concerned with a component comprised of two or more parts and FIG. 2 with a single part. The method herein illustrated is adapted to molding a plurality of parts simultaneously, for example, as a plurality of back stays which are arranged in interspersed fashion, or, for example, a plurality of upper parts susceptible of arrangement in interspersed fashion. Molds 60, 62 for this purpose are shown in FIGS. 14, 14a, 15 and 15a. The mold 60 has molding surfaces 66 for surface forming back stays and the mold 62 has molding surfaces 68 for forming a forepart, cuffs, a tongue and back stay. Each mold surface is backed by a cushion layer 61 and surrounded by a cutting die 70 so that the mold and cutting operations are effected nearly simultaneously. The cutting dies are shown in the sectional views (FIGS. 14a and 15a). The molding takes place during the initial application of molding pressure and the cutting follows the molding.

Successful molding of the face and edge of a part and attaching pieces to the front and back sides thereof is dependent upon proper fusion of the material of the part and maintaining it at the point of fusion to enable molding without requiring an inordinate application of pressure. Fusion may be achieved with different pieces of equipment. The means most expedient is a high frequency generator. High frequency heating is well known and the method of simultaneously molding the face and shaping the edge of the part according to this invention can be practiced by providing a press 73 (FIG. 16) embodying a fixed supporting platen 74 and a movable platen 76 adapted to be moved toward and from the fixed platen and cables 78 connecting the platens to a suitable source of power to produce a high frequency field between the platens when the movable platen is moved into engagement with a mold resting on the fixed platen so that fusion and application of molding pressure are applied simultaneously. The high frequency heating develops a deep penetration of the part quickly without raising the temperature of the platens substantially so that when the power source is cut off the platens will function as heat wells to draw off heat from the mold and thus effect rapid setting of the thermoplastic at the face of the part. Optionally, a two-step method of molding is employed, comprising first subjecting the part to molding pressure in engagement with the mold between pressure-applying platens in a high frequency field maintained between the platens and then transferring the mold and part to a second press for again applying molding pressure and cooling of the part while held at molding pressure to a temperature below fusion. Apparatus for carrying out the two-step method is illustrated in FIG. 16a, wherein there is shown an indexable table 87 arranged with a portion between the platens of a first press 81 and another portion between the platens of a second press 83. The platens of the press 81 are connected to a source of power for generating a high frequency field between them and the platens of the press 83 are provided with cooling coils 85.

FIGS. 17 and 18 show apparatus wherein the fusion of the part is effected before the part is introduced into the press for application of molding pressure comprising a rotatable table 80 arranged so that a portion of it moves beneath a heat generator 82 and another portion between the platens 84, 86 of a press 88. Cooling coils 100 surround the platens. A plurality of molds 90 are mounted on the table and as each mold moves beneath the heat generator in the direction of the press a fused part is removed from the heat generator and dropped face-down on the mold whereupon the mold and part are moved to the press 88 for application of molding pressure thereto. Suitable means may be provided for indexing the table 80 and timing the intervals of rotation with the time required to effect fusion of the part in the heat generator. A straight line method of moving the part successively through a high frequency field and from thence into a press may be employed in place of a rotating table such as a conveyor.

It has been found that the degree of fidelity is adversely affected by appreciable cooling of the part as it is moved from the first press to the second press or from the heat generator to the press and also that it is important to preheat the part prior to placing it in the mold in order to insure uniformity of fusion. Accordingly, in addition to the aforementioned apparatus it is desirable, as diagrammatically shown in FIG. 18, to have a preheating apparatus, here shown as an oven 92 or the like, within which a stack of parts may be placed and heated so as to become thoroughly saturated with heat up to a predetermined temperature below that of fusion. A preheating temperature for the parts in the range of 150° to 250° F. suffices. Such an oven 92 or heated receptacle may be mounted close to the table 80 of FIG. 18 or the table 87 of FIG. 16a in a position such that the parts can be easily removed therefrom and placed in a mold as it moves into the heat generator or press. It is also important that the mold itself be at a temperature which will not chill the fused part when the latter is dropped onto it; hence the mold itself is heated by means of a radiant heater 94 supported above the table at a place next preceding the place of deposit of the part in the mold to raise the temperature of its surface to a temperature in the range of 400° to 450° F. For a silicone mold penetration to a depth of 0.010 to 0.015 is desirable. The radiant heater 94 comprises a grid embodying a plurality of resistance coils and a reflector for focusing the heat on the surface of the mold as it moves therebeneath. In order to maintain the molded part in a state of fusion after it leaves the first press (FIG. 16a) or the heat generator (FIG. 17) there are provided muffles 89 and 96 between the first press and second press or heat generator and press through which the mold together with the part travel, protected from the ambient atmosphere. The muffles may be provided with heating coils (not shown) to maintain the fusing temperature and/or may be provided with means, for example, fans 91, 98, for directing currents of hot gases over the parts and molds for the same purpose.

The heat generator for open heating, that is, for effecting preheating or fusion of the part before it is placed in a press for applying molding pressure, may comprise any suitable heating means, for example, in lieu of high frequency heating, a microwave generator or a radiant heat generator.

Whatever heating means is employed it is necessary particularly if the operation is to be carried out on a production basis to provide means for dissipating the heat in the press platens because even though the press platens are quite massive they do not conduct heat away from the mold fast enough to provide for a heat differential which will cool the mold sufficiently to effect setting of the molded part and to provide for control of lateral flow to enable obtaining suitable edge formation. Hence the platens are either cored to provide for circulation of a cooling fluid or coils 100 are placed about the platens so as to draw the heat therefrom.

A roller type press 102 (FIG. 19) may be employed in place of a platen type press to obtain rolling pressure. Such a press comprises a lower fixed roller 104 and an upper adjustably mounted drum 106 of relatively large diameter. One or more molds 108 are mounted to the cylindrical surface of the drum so that they will be carried around therewith relatively to the lower fixed supporting roll. By adjusting the height of the drum relative to the fixed roller the molds may be caused to apply the required pressure to effect molding of the part between it and the fixed roller. Since the molding pressure is now applied along a line rather than over an area the pressure necessary to produce uniform molding over the entire surface may be easily attained in spite of variations in thickness of the mold or in the part itself. A conveyor 110 or the like may be provided for feeding the part from the heat generator 12 through the nip of the drum and roller. If the mold is comprised of an elastomer it may be easily conformed to the cylindrical surface of the drum, the diameter of which should be large enough so that there is no distortion of the mold. If a metal mold is employed it must be shaped to the contour of the drum. A muffle 114 for protecting and maintaining the surface of the part fused during transfer from the heat generator to the nip of the drum and roll is desirable. Additionally, but not shown, means may be provided for preheating the molds and the parts.

The method herein described provides components which may be joined to complete the articles of which they are a part without additional finishing operations. Thus the component parts of shoes made according to this method may be stitched and lasted without trimming, skiving, edge-finishing and/or lining operations, all of which take time and add to the cost of manufacture.

The invention has been described with reference to components of relatively small area, to wit, parts of shoe uppers, handbags and the like; however, it is to be understood that the method is adapted to molding the faces and edges of components of much larger area such as the component parts of raincoats, trench coats, skirts and collars, cuffs, belts and the like for the aforesaid articles. Surface and edge-finishing of such items can be readily achieved with a silicone molding die in the form of a cylinder of relatively large diameter, the surface of which embodies the surface configuration and edge treatment to be imparted to the article. The premolding of the sheet material to provide the desired configuration and edge-finish enables manufacture of the articles of which they comprise parts with a material saving in time, labor and cost.

Materials suitable for making thin parts according to this invention comprise the vinyl polymers and copolymers, vinyl chlorides, polypropylenes and polyvinyl chlorides (PVC).

We claim:

1. Apparatus for making a relatively thin part with a vinyl face material imitative of a predetermined pattern comprising in combination a mold embodying the surface configuration to be imparted to the surface of the part, a press embodying spaced parallel platens between which the mold and part to be molded are adapted to be disposed for application of molding pressure to the part with the back sides of the mold and part in a heat transferring engagement with the platens, wherein the molding pressure is effected without requiring an inordinate application of pressure, means connected to the platens operable to produce a high frequency field between the platens simultaneously with the application of molding pressure to heat the thermoplastic face of the part at the interfaces of the part and mold to a fusing temperature to cause the thermoplastic face to take the impression in the mold, and means for continuously cooling the platens to a temperature below the fusing temperature of the thermoplastic to contain the lateral flow of the thermoplastic at the interfaces to the perimeter of the mold.

2. Apparatus according to claim 1, wherein the mold is comprised of silicone rubber.

3. Apparatus according to claim 1, comprising means for preheating the part prior to effecting fusing of the face material.

4. Apparatus according to claim 1, comprising means for preheating the mold prior to placing the part in engagement therewith.

5. Apparatus for making a relatively thin part with a vinyl face material imitative of a predetermined pattern comprising in combination a mold enbodying a surface configuration corresponding to that to be imparted to the surface of the part, a heat generator for fusing the surface of the part, a press for receiving the mold and part for application of molding pressure to the part to press the fused surface into intimate engagement with the mold, wherein the molding pressure is effected without requiring an inordinate application of pressure, means for cooling the press and maintaining it at a temperature below the fusion temperature of the thermoplastic at the face of the part and a muffle for maintaining the face of the part at fusing temperature during transfer from the heat generator to the press.

6. Apparatus according to claim 5, wherein the manifold embodies heating means for maintaining the mold and part at said fusing temperature.

7. Apparatus according to claim 5, comprising means for preheating the mold.

8. Apparatus according to claim 5, comprising means for moving the mold and part from the heat generator to the press for application of molding pressure.

9. Apparatus according to claim 5, wherein the means for effecting movement of the mold and part from the heat generator to the press is an indexable table.

10. Apparatus according to claim 5, wherein the means for effecting movement of the mold and part from the heat generator to the press is an endless conveyor.

11. Apparatus according to claim 5 wherein the press comprises a pair of rolls between which the part is moved, one of said rolls having a peripheral surface embodying the surface configuration to be imparted to the part and the other comprising a support roll for holding the part pressed against the one roll as the part is moved between the rolls.

12. Apparatus according to claim 11 comprising means for adjusting the rolls relative to each other to apply a predetermined molding pressure to the part.

13. Apparatus for molding a relatively thin part with a vinyl face material to impart thereto a predetermined surface configuration comprising in combination a mold embodying the surface configuration to be imparted to the face of the part, a first press embodying a high frequency heat generator in which the part is adapted to be subjected to pressure of the mold in a high frequency field such as to effect fusing of the face and molding thereof to the surface configuration of the mold, a second press embodying cooling coils wherein the mold and part are adapted to be subjected to the pressure of the mold and cooled to a temperature below fusing, wherein the molding pressure is effected without requiring an inordinate application of pressure, and means for transferring the mold and part from the first press to the second press.

14. Apparatus according to claim 13, comprising a conveyor for moving the mold and part from the first press to the second press.

* * * * *